(12) United States Patent
Iseri et al.

(10) Patent No.: US 7,333,282 B2
(45) Date of Patent: Feb. 19, 2008

(54) DATA STORAGE DEVICE AND DATA STORAGE DEVICE CONTROL METHOD

(75) Inventors: Kaoru Iseri, Kanagawa (JP); Atsushi Tobari, Kanagawa (JP); Yasuhiro Iihara, Kanagawa (JP); Masanori Aratani, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/317,193

(22) Filed: Dec. 22, 2005

(65) Prior Publication Data
US 2006/0139790 A1  Jun. 29, 2006

(30) Foreign Application Priority Data
Dec. 27, 2004  (JP) ............................. 2004-377828

(51) Int. Cl.
G11B 19/04 (2006.01)
G11B 27/36 (2006.01)
G11B 5/55 (2006.01)
(52) U.S. Cl. .............................. 360/60; 360/75; 360/31
(58) Field of Classification Search ................ None
See application file for complete search history.

(56) References Cited

U.S. PATENT DOCUMENTS

| 6,138,516 A * | 10/2000 | Tillman | 73/649 |
| 6,510,014 B2 * | 1/2003 | Kikuta et al. | 360/60 |
| 6,735,033 B1 * | 5/2004 | Codilian et al. | 360/60 |
| 6,754,021 B2 * | 6/2004 | Kisaka et al. | 360/60 |
| 6,882,489 B1 * | 4/2005 | Brunnett et al. | 360/60 |
| 2005/0073764 A1 * | 4/2005 | Ogawa et al. | 360/60 |

FOREIGN PATENT DOCUMENTS

JP  2002-109840  4/2002

\* cited by examiner

*Primary Examiner*—William R. Korzuch
*Assistant Examiner*—Jason Olson
(74) *Attorney, Agent, or Firm*—Townsend and Townsend and Crew LLP; Patrick Duncan (57) ABSTRACT

Embodiments of the invention avoid an off-track write when an impact is applied. A hard disk drive according to one embodiment of the present invention comprises a magnetic disk; an actuator for moving a head element section over the magnetic disk; and an HDC/MPU for prohibiting the head element section from writing onto the magnetic disk for a short period when a detected impact is found to be greater than a low reference level and not greater than a high reference level, and prohibiting the head element section from writing onto the magnetic disk for a period longer than the short period when the detected impact is found to be greater than the high reference level.

17 Claims, 9 Drawing Sheets

$G \leqq C1$ $C1 < G \leqq C2$

Write prohibited

AT1

↑
Impact G $C2 < G$

Write prohibited

AT2

↑
Impact G

DATA STORAGE DEVICE AND DATA STORAGE DEVICE CONTROL METHOD

CROSS-REFERENCES TO RELATED APPLICATIONS

This application claims priority from Japanese Patent Application No. JP2004-377828, filed Dec. 27, 2004, the entire disclosure of which is incorporated herein by reference.

BACKGROUND OF THE INVENTION

The present invention relates to a data storage device and data storage device control method, and more particularly to a write control technology depending on the detected impact.

Various devices using optical disks, magnetic tapes, and other media are known as data storage devices. Among others, a hard disk drive (HDD) is now widely used as a storage device for use with a computer and counted as an essential storage device for a present-day computer system. Due to its excellent characteristics, the hard disk drive has found an increasingly wide range of applications, including not only a computer but also a motion picture recorder/reader, a car navigation system, a sound recorder/reader, a cellular phone, and a removable memory for use with a digital camera.

The hard disk drive comprises a magnetic disk for storing data, a head element section for performing a data read/write operation in relation to the magnetic disk, a slider to which the head element section is fastened, and an actuator for holding the slider and moving the head element section to a desired position over the magnetic disk. The actuator is driven by a voice coil motor. When turned on a pivot, the actuator radially moves a head over a rotating magnetic disk. This allows the head element section to access a desired track that is formed on the magnetic disk and perform a data read/write process.

Within the hard disk drive, the actuator, which pivots, moves the head element section. Therefore, extraneous impact may vibrate a mechanism to the detriment of data read/write accuracy. Particularly if any impact is applied from the outside during a write sequence, the head element section writes data on a track other than a target track (off-track write) due to actuator movement or vibration, thereby erasing necessary data on the magnetic disk.

Under the above circumstances, the technology disclosed, for instance, by Patent Document 1 (Japanese Patent Laid-Open No. 2002-109840) makes it possible to position a shock sensor so as to measure the X and Y components of impact applied to the disk surface, calculate the radial component of the impact from current position information, which the head element section reads from the disk, and reduce the head positioning error that may be caused by extraneous vibration or impact.

BRIEF SUMMARY OF THE INVENTION

It is possible to avoid an off-track write by prohibiting a write operation until actuator (head element section) vibration comes to an end when a reference level is exceeded by a detected impact. The hard disk drive has a shock sensor, and prohibits a write operation for a predetermined period of time when the reference level is exceeded by a value detected by the shock sensor.

However, the inventors have found that the hard disk drive may perform an off-track write even when the write operation is prohibited for a certain period of time. The off-track write is evident particularly when the hard disk drive uses a femto slider, which includes a small-size slider. Careful studies have indicated that the above phenomenon is caused by residual vibration remaining in the actuator. When impacted, the actuator not only pivots greatly but also vibrates. Vibration invoked in this manner persists for a while (residual vibration). In a conventional hard disk drive, the residual vibration terminates within a period during which a write operation is prohibited. However, it is conceivable that the residual vibration persists for a relatively long period in some hard disk drives. Since the residual vibration described herein is high-frequency vibration, it cannot be detected by a shock sensor or from a servo signal.

One cause for such a long residual vibration period is described below. In recent years, actuator rigidity is increasingly raised in order to provide enhanced impact resistance. Rigidity is increased by reducing the weight of the actuator and optimizing its shape. However, since the material's internal loss coefficient remains unchanged, the use of the above rigidity enhancement method prolongs the period of residual vibration. The reason is that the amount of energy released outward as heat or sound per unit time decreases with a decrease in the amount of actuator deformation.

Another cause is described below. In a small-sized femto slider, the amount of suspension weight addition is small. Therefore, vibration is not likely to attenuate when a slider vibration mode is invoked by an impact of short duration.

The present invention has been made in view of the above circumstances and makes it possible to effectively prevent a write error from being caused by extraneous impact.

In a first aspect of the present invention, a data storage device comprises a recording disk; an actuator for moving a head over the recording disk; and a controller for prohibiting the head from writing onto the recording disk for a first period when a detected impact is found to be greater than a first reference level and not greater than a second reference level, and prohibiting the head from writing onto the recording disk for a period longer than the first period when the detected impact is found to be greater than the second reference level. Since the write prohibition period is varied in accordance with the impact level, it is possible to avoid a write error while avoiding performance deterioration.

In a second aspect of the present invention, the data storage device according to the first aspect of the present invention further comprises a shock sensor, wherein, when a seek operation is performed in a write sequence, the controller judges, in accordance with an evaluation value derived from the output of the shock sensor, whether the detected impact is greater than the second reference level; and wherein, when a track following operation is performed in the write sequence, the controller judges, in accordance with an evaluation value derived from a servo signal read by the head, whether the detected impact is greater than the second reference level. Consequently, it is possible to achieve proper impact detection during a seek operation and track following operation. In a third aspect of the present invention, the second reference level for the seek operation differs from the one for the track following operation.

In a fourth aspect of the present invention, the data storage device according to the first aspect of the present invention further comprises a shock sensor and a comparator for binarizing the output of the shock sensor, wherein the controller judges, in accordance with the duty cycle of a binarized signal output from the comparator, whether the detected impact is greater than the second reference level. Consequently, it is possible to determine the magnitude of an impact even when a high-sensitivity shock sensor is used.

In a fifth aspect of the present invention, the controller according to the first aspect of the present invention uses a single binarized signal output from the comparator to judge whether the detected impact is greater than the first reference level. Consequently, it is possible to detect a small impact with a single shock sensor and judge whether a detected impact is greater than a predetermined reference level.

In a sixth aspect of the present invention, the data storage device according to the first aspect of the present invention further comprises a shock sensor and a comparator for binarizing the output of the shock sensor, wherein the controller samples binarized signals output from the comparator at a predetermined sampling frequency within a predetermined period of time, integrates sampled values, generates an evaluation value with a value derived from integration, and judges, if the evaluation value is greater than a threshold value, that the detected impact is greater than the second reference level. Consequently, it is possible to perform a computation process with ease when a high-sensitivity shock sensor is used, and judge whether a detected impact is greater than a predetermined reference level. In a seventh aspect of the present invention, the above-mentioned integration is performed with values that are sampled during a seek period for a write operation. This makes it possible to effectively avoid an erroneous detection and properly achieve impact detection during a seek operation.

In an eighth aspect of the present invention, when the head accesses a target address in a write sequence, the controller calculates a difference value representing the difference between a current head position and a target head position from a servo signal, and uses the calculated difference value to judge whether the detected impact is greater than the second reference level. This makes it possible to accurately determine the magnitude of an impact. In a ninth aspect of the present invention, the controller samples the difference value at different times, multiplies a plurality of resulting sampled values by a weighting factor, integrates resulting weighted values to generate an evaluation value, and judges, if the evaluation value is greater than a threshold value, that the detected impact is greater than the second reference level. This makes it possible to effectively avoid an erroneous detection of an impact greater than a predetermined level and accurately determine the magnitude of an impact. In a tenth aspect of the present invention, the sampled values are sampled during a track following period in a write sequence. This makes it possible to properly detect a great impact during a track following period.

In an eleventh aspect of the present invention, the data storage device according to the first aspect of the present invention further comprises a shock sensor and a comparator for binarizing the output of the shock sensor, wherein the controller samples outputs from the comparator during a seek period in a write sequence, integrates resulting sampled values, and judges, if the integrated value is greater than a threshold value, that the detected impact is greater than the second reference level; and wherein, when a track following operation is performed in the write sequence, the controller calculates a difference value representing the difference between a current head position and a target head position from a servo signal, multiplies a plurality of difference values, which are obtained at different times, by a weighting factor, integrates resulting weighted values to generate an evaluation value, and judges, if the evaluation value is greater than a threshold value, that the detected impact is greater than the second reference level. Consequently, it is possible to accurately detect an impact that is greater than a predetermined level.

In a twelfth aspect of the present invention, a write sequence control method for use in a data storage device comprises the steps of: starting to gain access to a head's target address; prohibiting, if an impact that is greater than a first reference level and not greater than a second reference level is detected during a period of the access, the head from writing onto the recording disk for a first period; and prohibiting, if an impact greater than the second reference level is detected during a period of the access, the head from writing onto the recording disk for a period longer than the first period. Since the write prohibition period is varied in accordance with the impact level, it is possible to avoid a write error while avoiding performance deterioration.

In a thirteenth aspect of the present invention, the write sequence control method according to the twelfth aspect of the present invention further comprises the step of sampling a binarized value representing the output of a shock sensor at a predetermined frequency during a seek period, integrating the resulting sampled values to generate an evaluation value, and judging according to the evaluation value whether the impact is greater than the second reference level. Consequently, it is possible to determine the magnitude of an impact even when a high-sensitivity shock sensor is used.

In a fourteenth aspect of the present invention, the write sequence control method according to the twelfth aspect of the present invention further comprises the step of calculating a difference value representing the difference between a current head position and a target head position from a servo signal during a track following period, multiplying current and previous sampled difference values by a weighting factor, and integrating resulting weighted values to judge whether impact is greater than the second reference level. This makes it possible to accurately detect an impact that is greater than a predetermined level.

The present invention effectively prevents a write error from being caused by extraneous impact.

BRIEF DESCRIPTION OF THE DRAWINGS

FIGS. 6(*a*), 6(*b*), and 6(*c*) schematically illustrate the relationship between vibration waveforms and logical configuration output signals (output values), which prevail when a great impact is applied from the outside during seeking, in accordance with one embodiment of the present invention.

DETAILED DESCRIPTION OF THE INVENTION

Embodiments of the present invention are described below. For the sake of clarity in explanation, the following descriptions and accompanying drawings are abbreviated and simplified as appropriate. Like elements in the drawings are denoted by like reference numerals and will not be described repeatedly for the sake of clarity.

Figure 1:
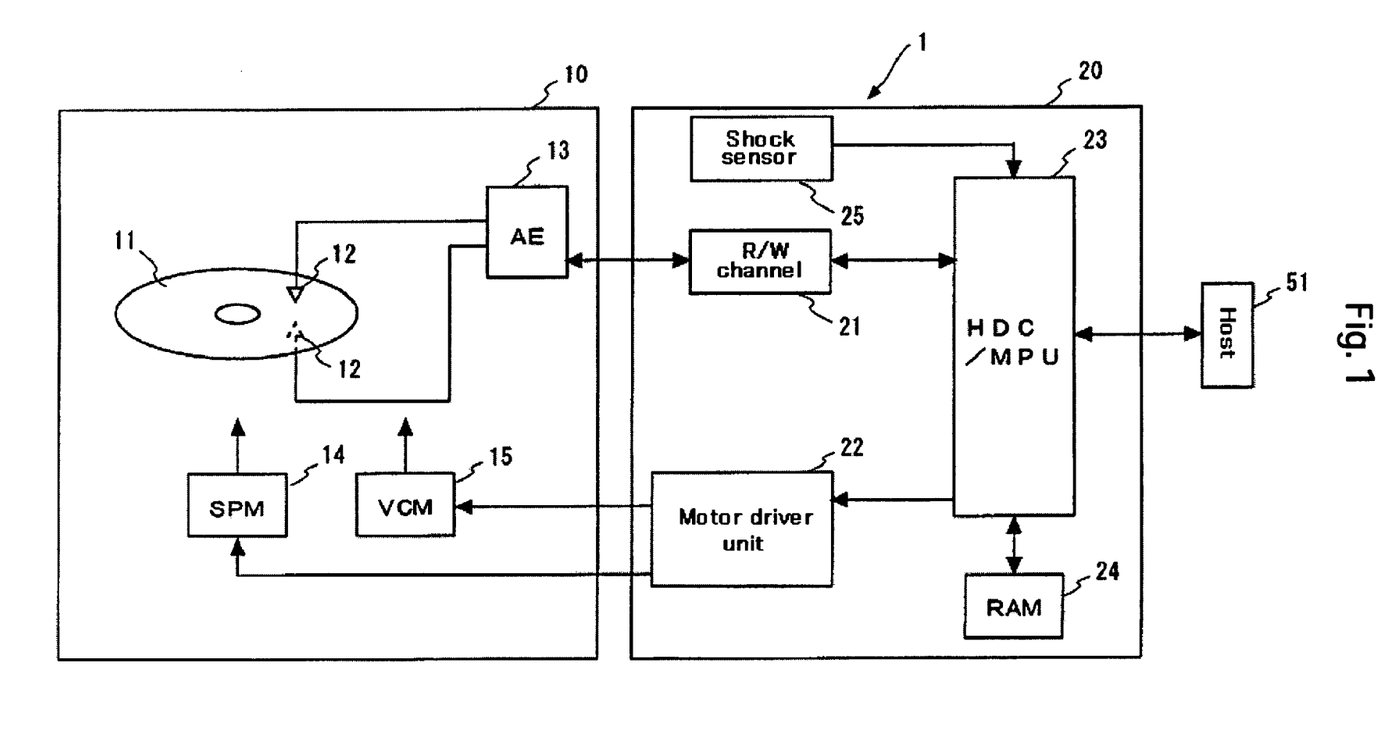
FIG. 1 is a block diagram that schematically illustrates the configuration of a hard disk drive according to one embodiment of the present invention.

Specific embodiments of the present invention will now be described with reference to the accompanying drawings. The present invention relates to impact detection in a data storage device. To facilitate understanding of the present invention, the overall configuration of a hard disk drive (HDD), which is a typical data storage device, will be first summarized. FIG. 1 is a block diagram that schematically illustrates the configuration of a hard disk drive 1 according to an embodiment of the present invention. As shown in FIG. 1, the hard disk drive 1 comprises a magnetic disk 11, which is a typical recording disk (recording medium), a head element section 12, which is a typical head, an arm electronic circuit (arm electronics or AE) 13, a spindle motor (SPM) 14, and a voice coil motor (VCM) 15. These components are positioned within a hermetically sealed enclosure 10.

The hard disk drive 1 includes a circuit board 20, which is fastened to the outer surface of the enclosure 10. Mounted on the circuit board 20 are a read/write channel (R/W channel) 21, a motor driver unit 22, an integrated circuit incorporating a hard disk controller (HDC) and an MPU (this integrated circuit is hereinafter referred to as the HDC/MPU) 23, a RAM 24, which is a typical memory, and other ICs. The hard disk drive 1 according to the present embodiment includes a shock sensor 25, which is mounted on the circuit board 20. The circuit components can be integrated into a single IC or mounted separately in a plurality of ICs.

The HDC/MPU 23 receives write data from an external host 51. The head element section 12 writes the received write data onto the magnetic disk 11 via the R/W channel 21 and AE 13. Read data, which is stored on the magnetic disk 11, is read by the head element section 12. The HDC/MPU 23 then outputs the read data to the external host 51 obtained via the AE 13 and R/W channel 21.

Figure 2:
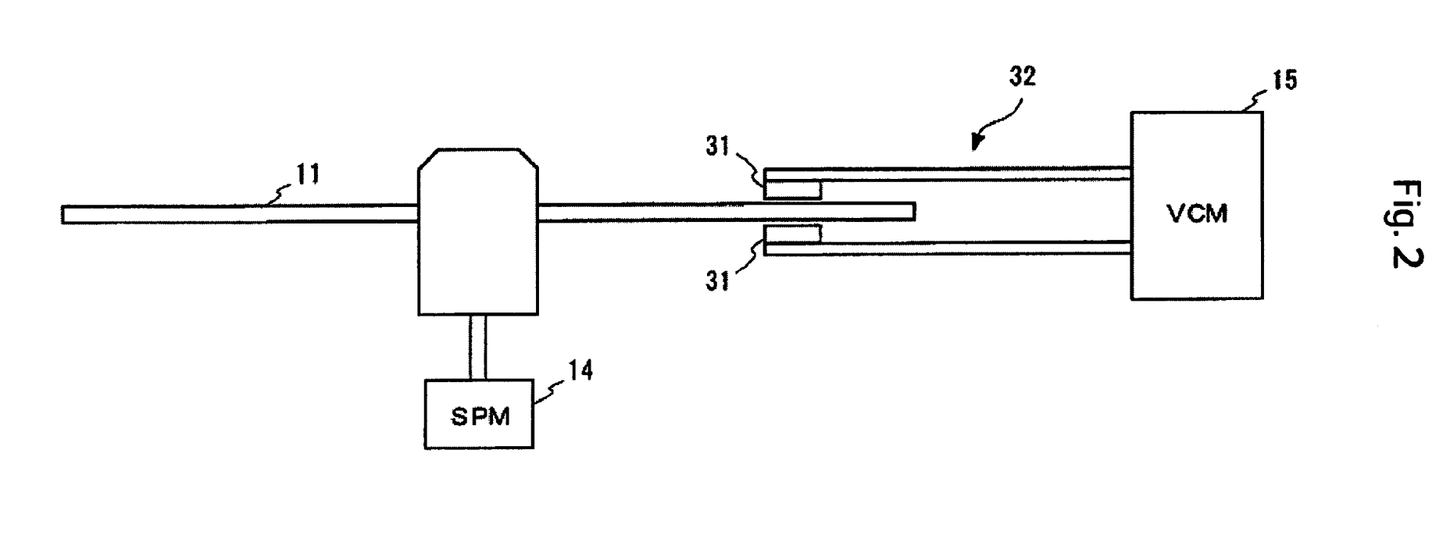
FIG. 2 schematically illustrates a drive mechanism for a magnetic disk and head element section according to one embodiment of the present invention.

The drive mechanism for the magnetic disk 11 and head element section 12 will now be summarized with reference to FIG. 2. The magnetic disk 11 is fastened to a rotation shaft of the SPM 14. The SPM 14 is driven by the motor driver unit 22 to rotate the magnetic disk 11 at a predetermined speed. The magnetic disk shown in FIGS. 1 and 2 has a data recording surface on both sides. Head element sections 12 are provided to handle both recording surfaces. Each head element section 12 is fastened to a slider 31. The slider 31 is fastened to the leading end of an actuator 32. When driven by the VCM 15, the actuator 32 oscillates to move the slider 31 and head element section 12.

To read data from or write data onto the magnetic disk 11, the actuator 32 moves the slider 31 (head element section 12) to a location above a data area on the surface of the magnetic disk 11, which is rotating. When the actuator 32 pivots on a rotation shaft, the slider 31 moves radially over the surface of the magnetic disk 11. The head element section 12 is then allowed to access a desired position (address) on the magnetic disk 11.

Typically, the head element section 12 comprises a write head and a read head. The write head converts an electrical signal to a magnetic field in accordance with the data to be stored on the magnetic disk 11. The read head converts a magnetic field, which is received from the magnetic disk 11, to an electrical signal. The pressure invoked by the viscosity of the air between the ABS (air bearing surface) of the slider 31, which faces the magnetic disk 11, and the rotating magnetic disk 11 balances with the pressure that is oriented toward the magnetic disk 11 and applied to the slider 31 by the actuator 32. Consequently, the head element section 12, which is fastened to the slider 31, flies above the magnetic disk 11, providing a fixed clearance to the magnetic disk surface. The hard disk drive 1 should contain at least one magnetic disk 11. A recording surface may be formed on either side or both sides of the magnetic disk 11.

Returning to FIG. 1, each circuit section will now be described. The AE 13 selects one head element section 12 from a plurality of head element sections 12 for the purpose of accessing data, amplifies (with a preamplifier) at a fixed gain the read signal read by the selected head element section 12, and forwards the amplified read signal to the R/W channel 21. Further, the write signal output from the R/W channel 21 is delivered to the selected head element section 12.

The R/W channel 21 performs a write process on data that is transferred from the host 51. In the write process, the R/W channel 21 receives write data from the HDC/MPU 23, subjects the write data to code modulation, converts the code-modulated write data to a write signal (electrical current), and supplies the write signal to the AE 13. When data is to be supplied to the host 51, the R/W channel 21 performs a read process. In the read process, the R/W channel 21 receives a read signal from the AE 13, amplifies the received read signal to a read signal having a fixed amplitude, extracts data from the obtained read signal, and performs a decoding process on the extracted data. The signal to be read contains user data and servo signal. The decoded read data is supplied to the HDC/MPU 23.

Within the HDC/MPU 23, the MPU operates in accordance with microcode that is loaded into the RAM 24. When the hard disk drive 1 starts up, the magnetic disk 11 or ROM (not shown) loads the data required for control and data processing into the RAM 24 in addition to the microcode for the MPU. The HDC/MPU 23 performs necessary processes for head element section positioning control, read/write control, interface control, defect management, and various other data processing operations, and exercises overall control over the hard disk drive 1. Further, the HDC/MPU 23 according to the present embodiment exercises internal control by using a detection signal that is delivered from the shock sensor 25. The impact detection process performed by the HDC/MPU 23 and the internal control exercised for the impact detection process will be described later in detail.

The HDC/MPU 23 transmits to the host 51 the read data that is acquired from the R/W channel 21 and read from the magnetic disk 11. The read data obtained from the magnetic disk 11 is temporarily stored in a read buffer within the RAM 24 and then transferred to the host 51 via the HDC/MPU 23. The write data delivered from the host 51 is temporarily stored in a write buffer within the RAM 24 via the HDC/MPU 23, and then transferred to the magnetic disk 11 via the HDC/MPU 23 with predetermined timing.

Figure 3:
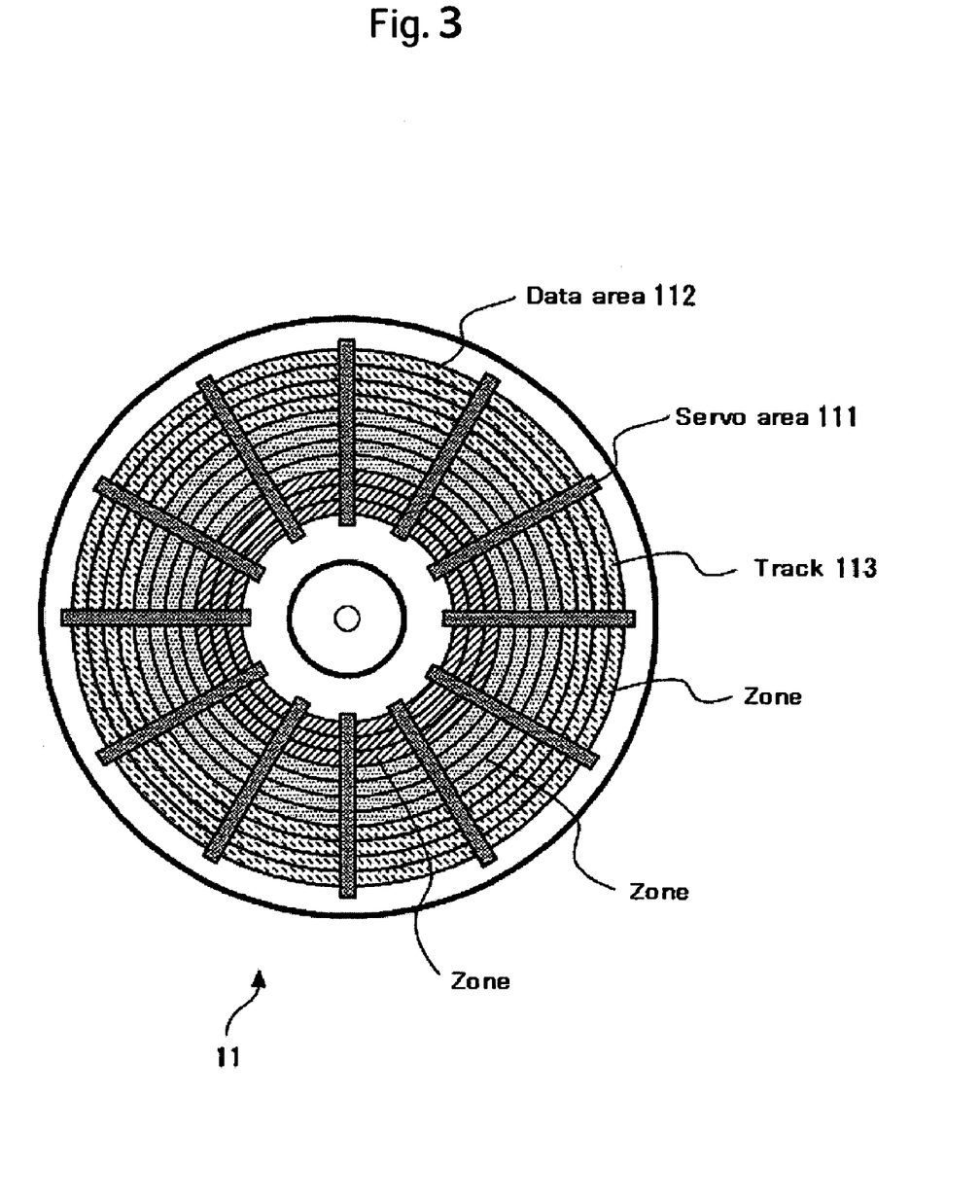
FIG. 3 schematically illustrates data that is recorded on the recording surface of a magnetic disk according to one embodiment of the present invention.

The data recorded on the magnetic disk 11 will now be described with reference to FIG. 3. FIG. 3 schematically illustrates data that is recorded on the recording surface of the magnetic disk 11. As shown in FIG. 3, a plurality of servo areas 111 and data areas 112 are formed on the recording surface of the magnetic disk 11. The servo areas 111 are radially extended from the center of the magnetic disk 11 and positioned at predetermined angular intervals. The data areas 112 are positioned between two neighboring servo areas 111. The servo areas 111 and data areas 112 are alternately positioned at predetermined angular intervals. The servo data for exercising positioning control over the head element section 12 is recorded in each servo area 111. The servo data includes a track number (cylinder number), sector number, and burst pattern. User data is recorded in each data area 112.

A plurality of tracks 113 are concentrically formed on the recording surface of the magnetic disk 11. Each track 113 has a predetermined width in the direction of the radius. Servo data and user data are recorded along the tracks 113. One track 113 between two neighboring servo areas 111 has a plurality of data sectors (user data recording units). Further, the tracks 113 are grouped into a plurality of zones according to the radial position of the magnetic disk 11. The number of sectors contained in a track 113 is set for each zone. In FIG. 3, three zones are indicated as an example. The recording density of the magnetic disk 11 can be increased by variously setting the recording frequency for individual zones.

The hard disk drive 1 according to the present embodiment exercises control in accordance with an extraneous impact. When, for instance, an extraneous impact greater than a predetermined reference level is detected, the hard disk drive 1 prohibits the head element section 12 from writing onto the magnetic disk 11. If the hard disk drive 1 is impacted during a write sequence, the head element section 12 moves or vibrates due to impact. Therefore, an off-track write may result. Therefore, as soon as an impact greater than the reference level is detected, the hard disk drive 1 prohibits the head element section 12 from performing a write for a predetermined period of time, thereby avoiding an off-track write. Further, the hard disk drive 1 varies the write prohibition period in accordance with the magnitude of the detected impact.

The operation performed in the hard disk drive 1 in a write sequence will now be described. In the write sequence, a write command is executed in the hard disk drive 1. If there is no cache hit, the head element section 12 accesses a target address (target sector) on the magnetic disk 11 in compliance with a write command from the host 51. This access comprises a seek and a track following operation.

First of all, the actuator 32 pivots during seeking to move the head element section 12 from the current track or unload position to a target track. If a load/unload method is employed, a ramp serves as the unload position. If a CSS (Contact Start Stop) method is employed, the unload position exists within an inner circular area of the magnetic disk 11. When the head element section 12 arrives at the target track, a track following operation begins. The actuator 32 positions the head element section 12 over the target track. When the magnetic disk 11 rotates so that a target sector is reached, the head element section 12 writes write data onto the target sector.

As described above, the hard disk drive 1 according to the present embodiment varies the write prohibition period in accordance with the magnitude of an extraneous impact. This makes it possible to properly avoid an off-track write while minimizing the degree of performance deterioration. This will be described in detail. The positional response of the head element section 12 to an extraneous impact is described below. First of all, the head element section 12 is moved away from the current track (initial response). The HDC/MPU 23 then exercises servo control to move the head element section 12 toward a target track. When the target track is reached, the head element section 12 follows it.

When impacted, the actuator 32 not only moves (pivots) but also begins to vibrate. Invoked vibration lasts for a while (residual vibration). The period of residual vibration varies with the magnitude of the impact. If the impact is small, the invoked vibration is small. Therefore, the residual vibration period of the actuator 32 is short. Typically, the vibration is attenuated by the time the head element section 12 arrives at the target track. If, on the other hand, the impact is great, the residual vibration period of the actuator 32 is long. Therefore, the actuator 32 (head element section 12) still vibrates even after the head element section 12 arrives at the target track. If, in this instance, the head element section 12 is allowed to continuously perform a write, an off-track write occurs.

If the residual vibration of the actuator 32 (head element section 12) can be detected, it is possible to avoid an off-track write by prohibiting a write operation while the residual vibration is detected. The servo signal read by the head element section 12 might be used to detect the residual vibration of the actuator 32. The vibration components of the head element section 12 can be partly detected from the servo signal. However, the servo data is divided when recorded on a track, and its sampling frequency is usually 13 kHz or so. Therefore, high-frequency vibration cannot be detected. The frequency of the residual vibration of the actuator 32 is as high as approximately 30 kHz. Therefore, the residual vibration of the head element section 12 cannot be detected through the use of the servo signal.

Alternatively, the shock sensor 25 might be used to detect the residual vibration of the actuator 32. However, the shock sensor 25 is positioned away from the actuator 32. Further, the detectable frequency band of a typical shock sensor 25 is 10 kHz or lower. Therefore, the residual vibration of the actuator 32 cannot be detected.

To avoid an off-track write, which arises out of residual vibration, a write operation might be prohibited for a long period of time after impact detection. Since the write operation is prohibited until the residual vibration terminates, it is possible to properly avoid an off-track write. However, if a long write prohibition period is set for every impact, no data can be written onto the magnetic disk 11 no matter whether the residual vibration is terminated in the case of a small impact. This greatly reduces the performance of the hard disk drive 1. To detect a slight impact in order to avoid an off-track write, a high sensitivity is set for the shock sensor 25. Consequently, the write prohibition period is extremely long so that the performance of the hard disk drive 1 is greatly affected.

Figure 4:
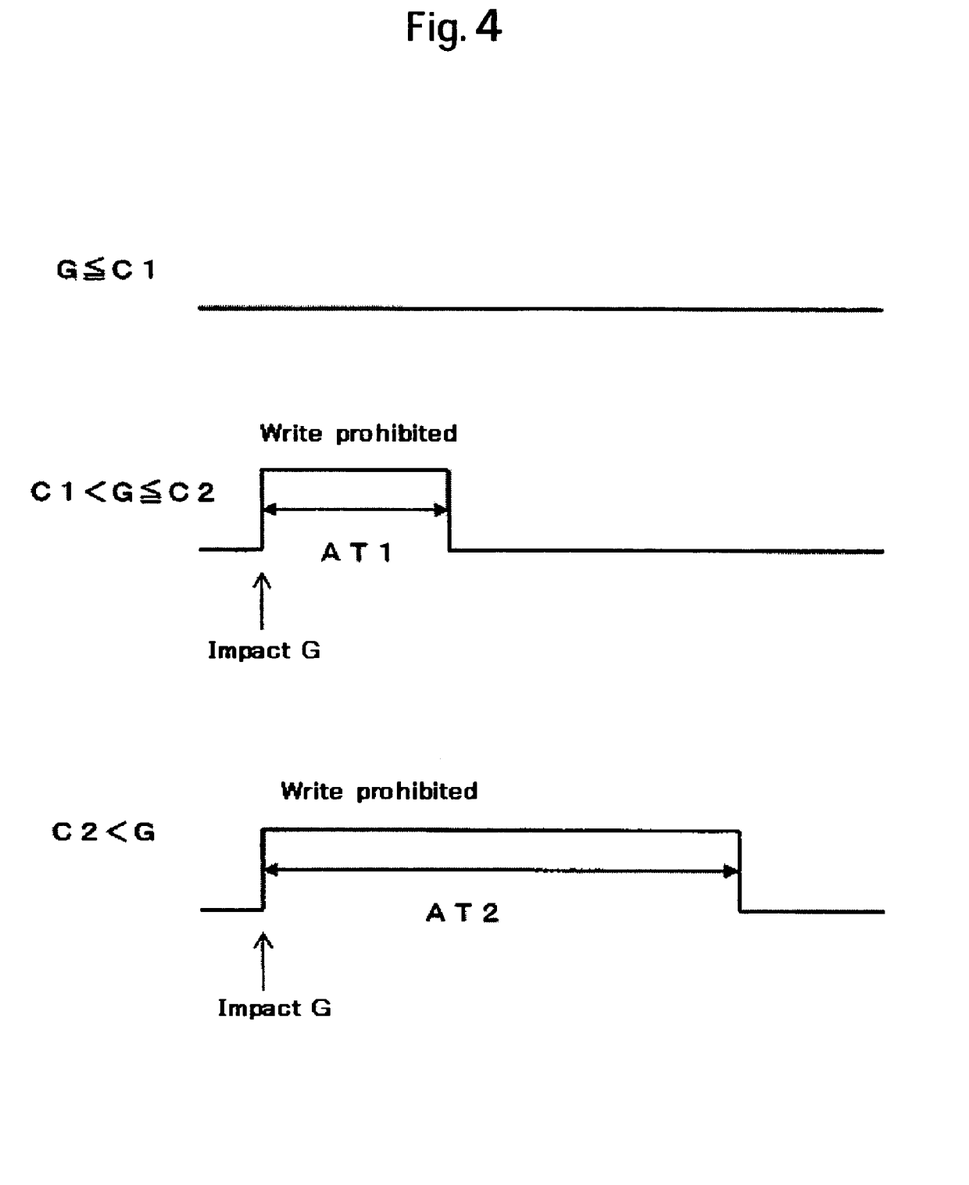
FIG. 4 schematically shows that a write prohibition period according to one embodiment of the present invention changes in accordance with the magnitude of impact.

Under the above circumstances, the hard disk drive 1 according to the present embodiment detects the magnitude of an externally applied impact and varies the write prohibition period in accordance with the detected magnitude. When a small impact is detected, the hard disk drive 1 prohibits a write operation for a short period of time. When a great impact is detected, the hard disk drive 1 prohibits a write operation for a long period of time. The shorter the duration of impact or the greater the amplitude of impact becomes, the greater the magnitude of impact becomes. In a preferred example, the hard disk drive 1 sets two write prohibition periods and two reference levels for impact magnitude judgment. As indicated in FIG. 4, the hard disk drive 1 provides a low reference level C1 and a high reference level C2, which is higher than reference level C1. Further, the hard disk drive 1 provides a short write prohibition period AT1 and a long write prohibition period AT2, which is longer than the short write prohibition period AT1.

If a detected impact G is not greater than reference level C1 (G≦C1), the hard disk drive 1 performs a normal write operation without performing any write prohibition setup. If the impact G is greater than reference level C1 and not greater than reference level C2 (C1<G≦C2), the hard disk drive 1 prohibits a write operation for period AT1. If the impact G is greater than reference level C2 (C2<G), the hard disk drive 1 prohibits a write operation for period AT2. In this manner, the hard disk drive 1 varies the write prohibition period in accordance with the magnitude of the impact. It is therefore possible to properly avoid an off-track write while minimizing the degree of performance deterioration. For effectiveness of off-track write avoidance and performance maintenance and increased ease of control, it is preferred that two write prohibition periods be set. However, an alternative is to set three or more reference levels and three or more write prohibition periods.

If, in the above example, the detected impact is greater than the high reference level C2, a write operation is prohibited during period AT2 without regard to the magnitude of the impact. Alternatively, however, when the high reference level C2 is exceeded, an increased number of write prohibition periods can be set depending on the magnitude of the impact. In other words, when the detected impact is greater than reference level C2, the hard disk drive 1 may prohibit a write operation for a period that varies with the magnitude of the impact. For example, a third reference level, which is higher than reference levels C1 and C2, may be set. Further, a third write prohibition period, which correlates to the third reference level, may be set. If it is judged that the third reference level is exceeded (this also corresponds to a situation where it is judged that reference level C2 is exceeded), the hard disk drive 1 may prohibit a write operation for the third write prohibition period.

Further, the hard disk drive 1 may be designed so as to use a predetermined reference level and write prohibition period or change the reference level and write prohibition period during the operation of the hard disk drive 1. The values for reference levels C1 and C2 typically vary with the detection timing particularly when the impact detection method employed by the hard disk drive 1 varies with the operation of the hard disk drive 1. It is preferred that the values be set so as to reduce the error frequency in the hard disk drive 1 while minimizing the degree of performance deterioration.

As described above, the hard disk drive 1 according to the present embodiment detects an impact greater than different reference levels. To properly avoid an off-track write, it is required that the shock sensor 25 detect a slight impact. Therefore, the dynamic range of the shock sensor 25 is small so that the shock sensor 25 cannot directly detect the magnitude of impact. If a shock sensor having a large dynamic range is furnished in addition to the shock sensor 25 described above, it is possible to detect small impacts and great impacts. However, the use of such different shock sensors should be avoided to prevent an increase in the number of parts used. The hard disk drive 1 according to the present embodiment detects small impacts by using an output value generated by the shock sensor 25. To detect great impacts, the hard disk drive 1 according to the present embodiment uses two methods. In one method, the hard disk drive 1 generates an evaluation value from an output signal that is generated by the shock sensor 25, and detects great impacts in accordance with the evaluation value. In the other method, the hard disk drive 1 generates an evaluation value from a servo signal that is read by the head element section 12, and detects great impacts in accordance with the evaluation value. The impact detection operation and the write prohibition control operation based on the detected impact, which are performed by the hard disk drive 1, will now be described. The subsequent description deals with a situation where two reference levels (C1 and C2) and two write prohibition periods (AT1 and AT2) are set.

As described above, the seek period and track following period are involved when the head element section 12 accesses a target sector. It is necessary that impact detection be performed during both periods. Within the seek period, the hard disk drive 1 according to the present embodiment detects a great impact by using an evaluation value that is generated from a signal output from the shock sensor 25. Within the track following period, however, an evaluation value generated from servo data is used to detect a great impact.

Figure 5:
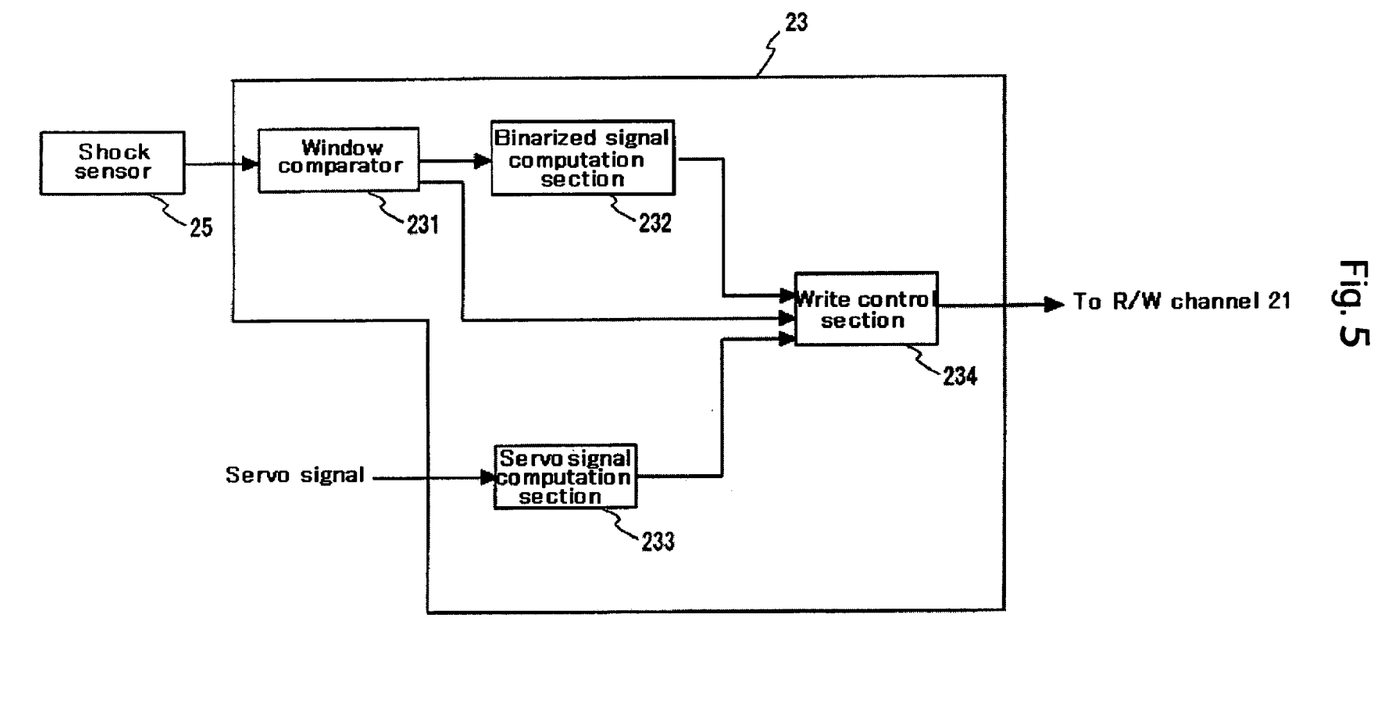
FIG. 5 is a block diagram illustrating a logical configuration concerning impact detection and write control based on impact detection in accordance with one embodiment of the present invention.

FIG. 5 is a block diagram illustrating the impact detection logical configuration of the hard disk drive 1 according to the present embodiment. The logical configuration for impact detection is mainly implemented in the HDC/MPU 23. Individual logical blocks in the HDC/MPU 23 can be implemented by hardware or implemented as the microcode to be executed by the MPU. As shown in FIG. 5, the HDC/MPU 23 comprises a window comparator 231, which is a typical comparator, a binarized signal computation section 232, a servo signal computation section 233, and a write control section 234. In FIG. 5, the binarized signal computation section 232, servo signal computation section 233, and write control section 234 constitute a typical controller that controls a write operation in accordance with a detected impact.

The window comparator 231 achieves binarization by comparing an input signal absolute value against a threshold value, and outputs a binarized signal. The binarized signal computation section 232 generates an evaluation value for detecting a great impact from the binarized signal that is output from the window comparator 231. The servo signal computation section 233 generates an evaluation value for detecting a great impact from servo data that is read by the head element section 12.

The write control section 234 determines the magnitude of the impact by using the binarized signal output from the window comparator 231 and the generated evaluation values. If necessary, the write control section 234 instructs the R/W channel 21 to prohibit a write operation. As described above, the write control section 234 sets a write prohibition period that varies in length depending on the magnitude of the impact. For example, the write control section 234 may include a counter that is decremented in accordance with a predetermined clock, define a plurality of write prohibition periods differing in length by setting different values as the counter initial value, and make measurements.

Figure 6:
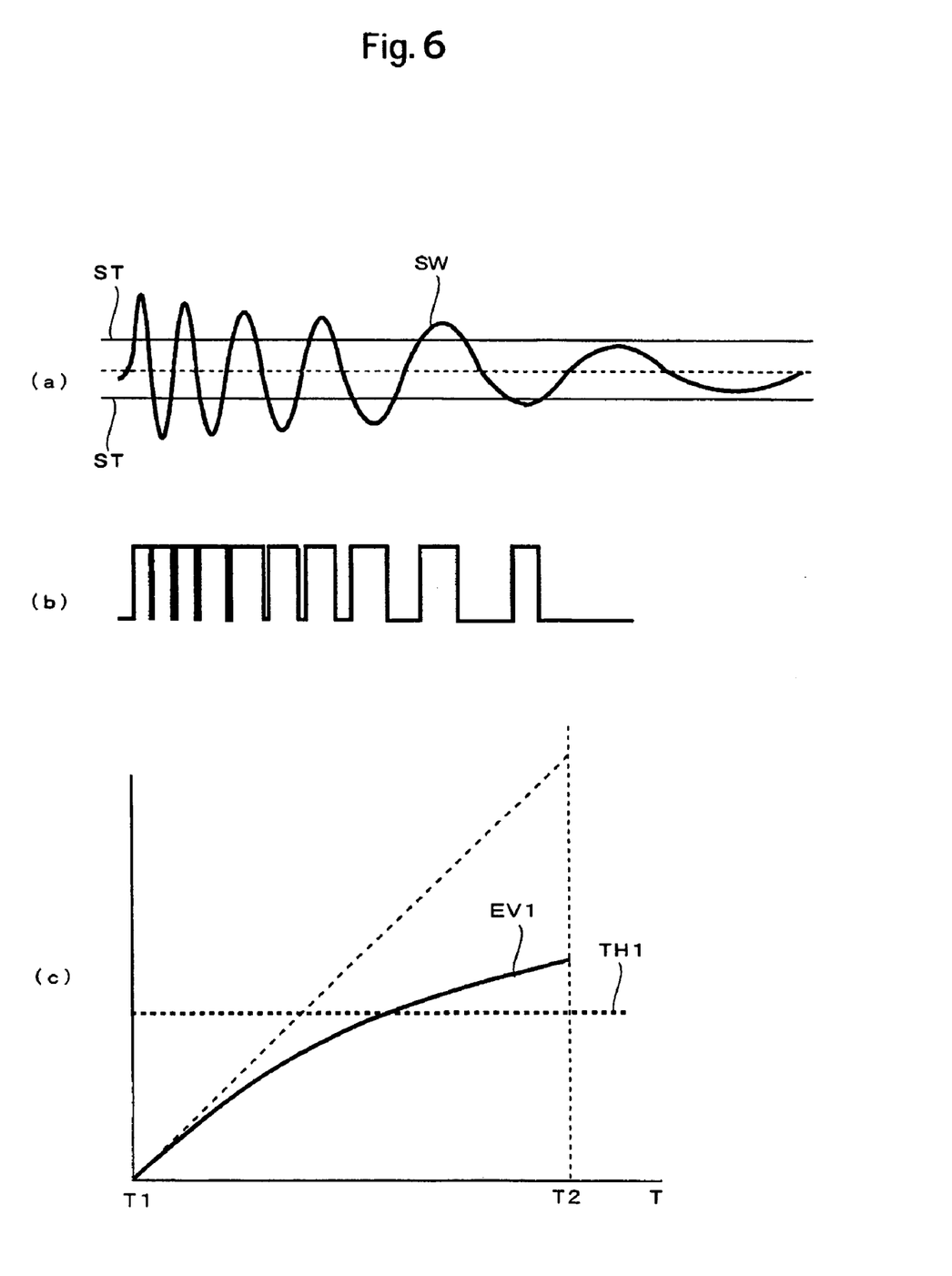

First of all, the impact detection operation performed during seeking will be described. While a seek is performed, the signal of the shock sensor 25 is used to detect a small impact and a great impact. During seeking, therefore, the shock sensor 25, window comparator 231, binarized signal computation section 232, and write control section 234 function as an impact detection device. FIGS. 6(a), 6(b), and 6(c) schematically illustrate the relationship between vibration waveforms and logical configuration output signals (output values), which prevail when a great impact is applied from the outside.

In FIG. 6(a), waveform SW represents a vibration that is invoked by the hard disk drive 1 when an impact is applied from the outside. Straight line ST represents a dynamic range of the shock sensor 25. FIG. 6(b) illustrates an output that is generated by the window comparator 231. Curve EV1 in FIG. 6(c) indicates how the computed value (evaluation value EV1) varies in the binarized signal computation section 232.

Referring to FIG. 6(a), the shock sensor 25 outputs an analog signal. The shock sensor 25 outputs to the window comparator 231 a signal that varies within the dynamic range defined by straight line ST. If the dynamic range is exceeded, an upper-limit or lower-limit value signal is output to the window comparator 231. If the absolute value of the output from the shock sensor 25 exceeds a threshold value, the window comparator 231 outputs "1" (High). If the absolute value is not greater than the threshold value, the window comparator 231 outputs "0" (Low). In the present example, the window comparator 231 outputs "1" when the analog output from the shock sensor 25 is an upper-limit or lower-limit value (ST) as indicated in FIG. 6(b).

The write control section 234 detects an impact greater than reference level C1 by using a single output from the window comparator 231. In other words, the R/W channel 21 is instructed to prohibit a write operation when the output value generated by the window comparator 231 is "1". More specifically, a write prohibition flag is set in a register within the R/W channel 21. Since the output generated by the shock sensor 25 is an analog signal, the output generated by the window comparator 231 also drastically alternates between "0" and "1" as indicated in FIG. 6(b). If write prohibition (timing for "1") and write permission (timing for "0") are controlled in accordance with a single output value generated by the window comparator 231, analog signal changes are complied with so that a write operation is permitted during a period during which the write operation should be prohibited. Then, an off-track write results. Therefore, when it is found that an output value of "1" is generated by the window comparator 231, the write control section 234 prohibits a write operation for a short prohibition period (which corresponds to the above-mentioned short write prohibition period AT1) without regard to subsequent output value changes. More specifically, the write control section 234 sets a flag on the R/W channel 21, and resets the flag when the short prohibition period AT1 elapses.

The output value generated by the window comparator 231 enters the binarized signal computation section 232. With a single output from the window comparator 231, it is impossible to accurately detect the magnitude of impact. Therefore, the evaluation value EV1 generated by the binarized signal computation section 232 is used to detect an impact greater than a reference level (which corresponds to the above-mentioned reference level C2). The binarized signal computation section 232 uses an output value duty cycle to generate evaluation value EV1. When a great impact is applied, the output value duty cycle of the window comparator 231 for an initial response is approximately 100% as indicated in FIGS. 6(a) and 6(b). Subsequently, the duty cycle gradually decreases with a decrease in the amplitude. Eventually, the duty cycle decreases to zero. If the impact is small, the duty cycle rapidly decreases. If the impact is great, on the other hand, a high duty cycle persists. Therefore, the magnitude of impact can be detected by detecting a duty cycle change within a predetermined period of time.

In the present example, the binarized signal computation section 232 samples the output value generated by the window comparator 231 (the value prevailing when an active "1" output is generated) at predetermined intervals. A plurality of sampled values are then integrated. The value derived from integration is output to the write control section 234 as an evaluation value. Integration computations are performed during the time interval between the instant at which a seek starts and the instant at which the seek ends. The write control section 234 compares the integrated value (evaluation value EV1), which is delivered from the binarized signal computation section 232, against threshold value TH1. When integrated value EV1 is greater than threshold value TH1, the write control section 234 concludes that an impact greater than the above-mentioned reference level C2 is encountered, and then prohibits a write operation for a long write prohibition period (which corresponds to the above-mentioned prohibition period AT2).

The rate of integrated value increase (the gradient of the integrated value with respect to time) is determined by the probability with which the comparator output is active. In other words, the rate of integrated value increase is determined by the output value duty cycle of the window comparator 231. As indicated in FIG. 6(c), evaluation value EV1, which is the integrated value of the comparator output, initially increases along a broken line having a gradient of 1, which represents a duty cycle of 100%, and then the gradient gradually decreases.

If the impact is great, the integrated value continuously increases at a high acceleration (gradient) during seeking and eventually becomes a great value. If, on the other hand, the impact is small, the acceleration (gradient) for the integrated value rapidly decreases with a decrease in the duty cycle. Therefore, the integrated value does not increase much, but converges to a relatively small value. Consequently, the integrated value of the output generated by the window comparator 231 can be used as evaluation value EV1 and compared against threshold value TH1 to determine whether a great impact is applied.

As described above, when a comparator output integrated value increase during a predetermined period of time (T1-T2) is used as an evaluation value, it is possible to determine whether the applied impact is greater than a high reference level. Integration computations may be performed during a seek period only. An alternative is to perform a computation process constantly and use an integrated value increase during a predetermined period as evaluation value EV1. When computations are to be performed during a seek period only, the binarized signal computation section 232 starts to perform integration computations, for instance, by setting the initial value to 0 at time T1 at which a seek begins, and terminates the computation process at time T2 at which the seek ends, as indicated in FIG. 6(c).

Figure 7:
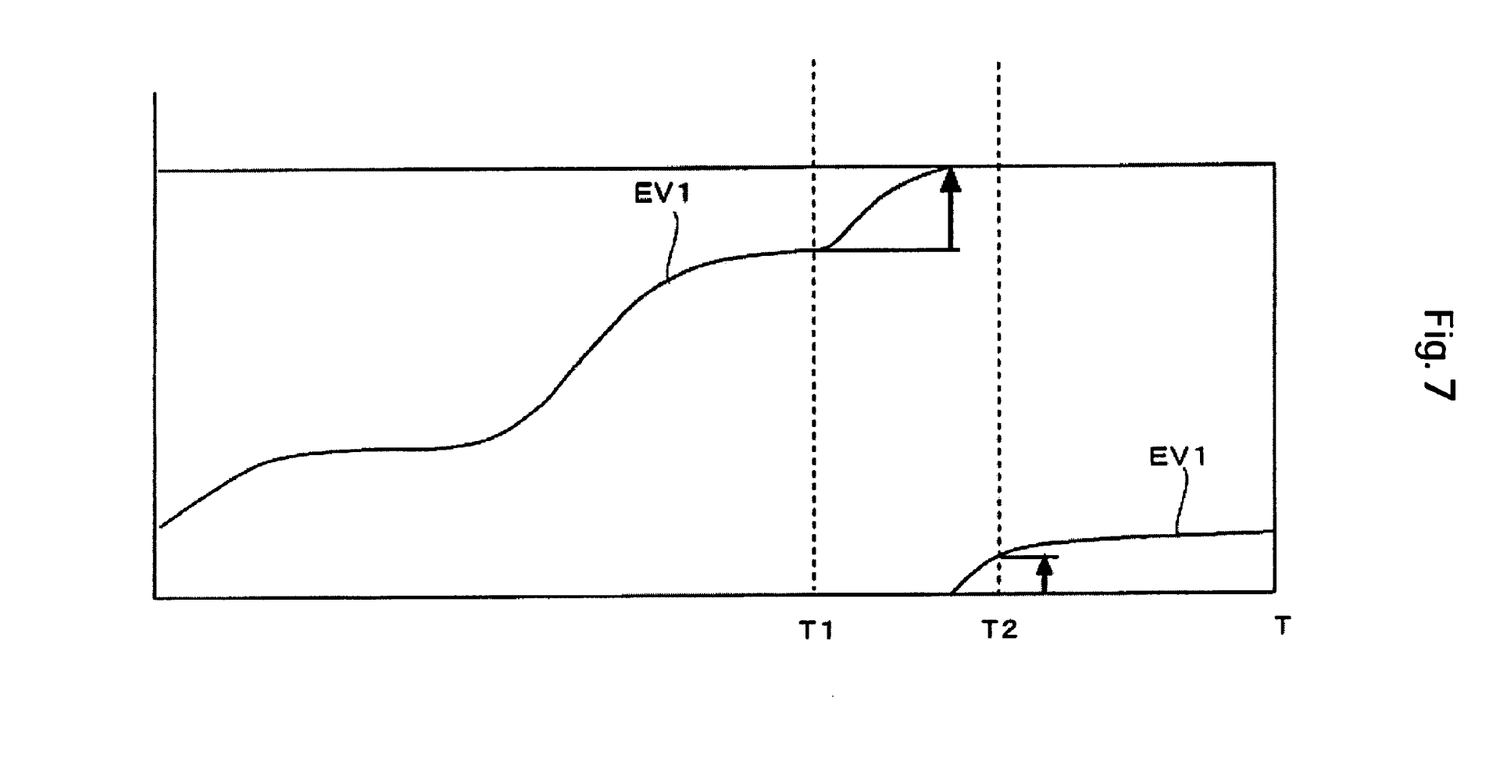
FIG. 7 schematically shows how evaluation value EV1 changes in response to an extraneous impact in a situation where a binarized signal computation section constantly performs a computation process in accordance with one embodiment of the present invention.

In a case where the computation process is to be performed constantly, the binarized signal computation section 232 continues to perform integration computations from the initial value (e.g., 0) as indicated in FIG. 7 when the integrated value exceeds an upper limit (e.g., 1000). Evaluation value EV1 is defined as an integrated value increase during a predetermined period of time (during a seek period in the above example). If, for instance, the integrated value changes from 800 to 200 during the T1-T2 period, the value 400 is used as evaluation value EV1.

A change in the duty cycle arises as a change in the integrated value gradient. Therefore, the magnitude of impact can be determined by using the gradient and not by using the magnitude of the integrated value. If, for instance, a threshold value is exceeded by an integrated value gradient (duty cycle) that is detected when a predetermined period of time elapses after the time of impact detection, it can be concluded that the applied impact is greater than a high reference level.

However, when a single gradient value prevailing at a predetermined time is used for judgment purposes, erroneous detection may result due, for instance, to noise. It is therefore preferred that a plurality of values be sampled for judgment purposes. In this respect, the above-mentioned integrated value is an ideal evaluation value. For increased ease of control, it is preferred that the integration period be the time interval between the start and end of seeking. However, a partial period selected out of such an integration period or some other predetermined period may be used. Further, as an alternative to using the integrated value directly as an evaluation value, a value computed from the integrated value may be used as evaluation value EV1.

The impact detection sequence to be performed during a track following period will now be described. Within the track following period, the signal of the shock sensor 25 is used to detect a small impact and the servo signal is used to detect a great impact. During the track following period, therefore, the shock sensor 25, window comparator 231, servo signal computation section 233, and write control section 234 function as an impact detection device. The operation for detecting a small impact (detecting an impact greater than reference level C1 but not greater than reference level C2) is not described herein because it is the same as in the seek period.

The operation for detecting an impact greater than the high reference level (reference level C2, which is mentioned above) during the track following period will now be described. Within the track following period, the write control section 234 detects a great impact by using evaluation value EV2, which is fed from the servo signal computation section 233. If evaluation value EV2 exceeds threshold value TH2, the write control section 234 determines that a write operation should be prohibited for a long period (period AT2, which is mentioned above). Therefore, the value to be set as a great impact reference level for the track following period does not always coincide with the value to be set as a reference level for the seek period.

The servo signal computation section 233 generates an evaluation value by using a servo signal that is read by the head element section 12. More specifically, the servo signal computation section 233 uses a difference value (|current position−target position|) that represents the difference between the target position and current position of the head element section 12. The target position and current position may take on a value whose higher-order bits represent a track number within servo data and whose lower-order bits represent a PES (position error signal), which conforms to the burst signal.

Figure 8:
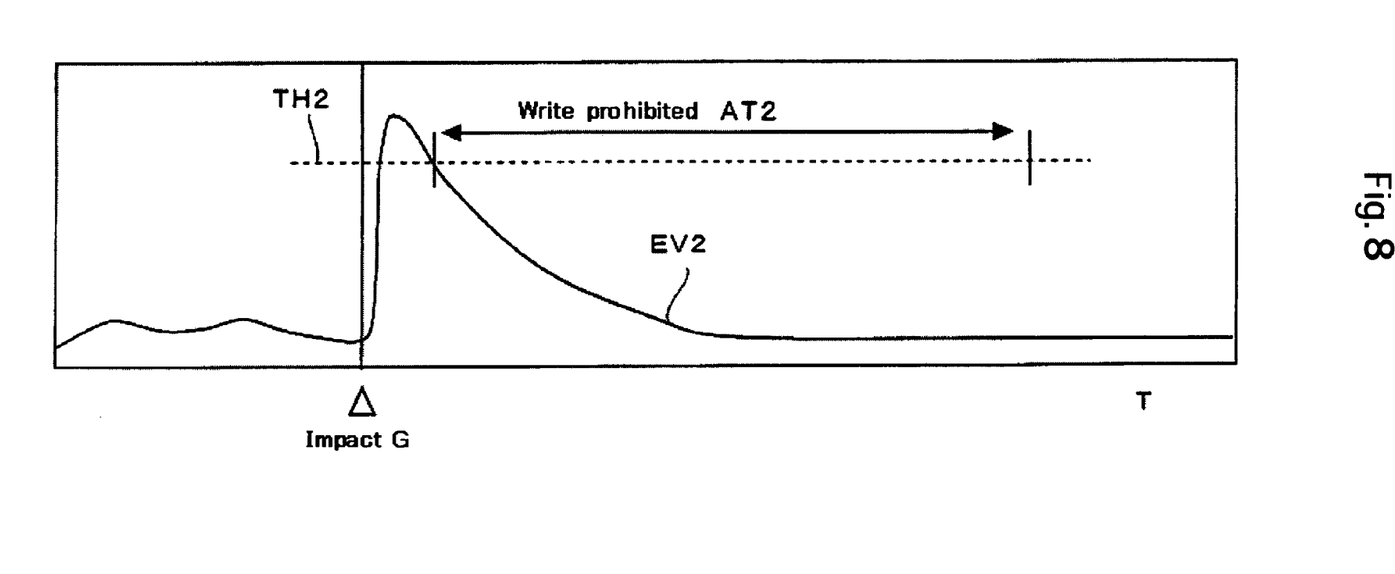
FIG. 8 shows how evaluation value EV2, which is generated by a servo signal computation section according to one embodiment of the present invention, changes in response to an extraneous impact.

The difference value can be obtained at a sampling frequency for the servo signal. The servo signal computation section 233 generates an evaluation value by multiplying a plurality of sampled difference values by a weighting factor and integrating the resulting multiplied values. FIG. 8 shows how evaluation value EV2, which is generated by the servo signal computation section 233, changes when an impact is applied from the outside. The example shown in FIG. 8 indicates how evaluation value EV2 changes when a great impact is applied. When a great impact is applied, evaluation value EV2 suddenly increases and exceeds threshold value TH2. Subsequently, evaluation value EV2 gradually decreases and converges to a fixed value. When evaluation value EV2 exceeds threshold value TH2 as indicated by the example in FIG. 8, the write control section 234 concludes that an impact greater than a reference level (reference level C2, which is mentioned above) is applied, and prohibits a write operation for a long write prohibition period (prohibition period AT2, which is mentioned above). The measurement of write prohibition period AT2 starts at the time when threshold value TH2 is last exceeded by evaluation value EV2, that is, at the time when evaluation value EV2 decreases below threshold value TH2.

One example of weighted integration is leftward z conversion of difference values, where the value z is a value greater than 1. It is preferred that evaluation value EV2 be obtained by effecting leftward z conversion by using as many previous difference values as possible that can be calculated from the latest (current) difference value. The difference values can be obtained at a servo signal sampling frequency. For example, evaluation value EV2 can be updated by using a difference value for each servo signal sampling operation after the hard disk drive 1 starts operating. The value z for z conversion should be set so that evaluation value EV2 does not significantly change in response to a small impact and suddenly changes in response to a great impact as indicated in FIG. 8.

Alternatively, evaluation value EV2 may be generated with a difference equation. More specifically, the current evaluation value EV2(n) can be generated by using the current difference value and an evaluation value EV2(n−1) that has been generated from a previous difference value. The above-mentioned leftward z conversion and difference equation both correspond to a typical integration of weighted difference values. Further, leftward z conversion corresponds to a typical difference equation. In these computing equations, a factor is selected so as to prevent evaluation value EV2 from diverging as indicated by the example in FIG. 8.

When a great impact is applied as described above, the head element section 12 is flipped away from a target position. When, on the other hand, a small impact is applied, the head element section 12 does not significantly move away from a target position. If there is a great distance between the current position and target position, a great difference value is maintained for a long period of time before the head element section 12 arrives at the target position. Meanwhile, evaluation value EV2 is subjected, as described above, to integration in which the current difference value and a plurality of previous difference values are used. Therefore, when a great difference value persists for a period longer than predefined due to a great impact, evaluation value EV2 greatly changes for the first time. When the head element section 12 moves a small distance due to a small impact or when a great difference value is momentarily detected due to noise, evaluation value EV2 does not significantly change. Therefore, evaluation value EV2 does not exceed threshold value TH2. Consequently, it is possible to properly detect a great impact while avoiding erroneous detection.

In the above example, the detection signal of the shock sensor 25 is used in the seek period to detect a great impact, whereas the servo signal is used in the track following period to detect a great impact. When an appropriate computation method is selected, it is possible to generate an evaluation value with the detection signal of the shock sensor 25 in the track following period and check for a great impact. When the output value generated by the window comparator 231 is directly subjected to integration as described above, the evaluation value diverges. It is therefore necessary to define the computation period, obtain an integrated value within the defined period, and use the obtained value as an evaluation value. In the above example, the defined period corresponds to the time interval between the start and end of seeking.

When the period of time for integration is defined for the track following period, it is possible to detect an impact greater than reference level C2 by using evaluation value EV1, which is obtained when integration is performed in the same manner as described above. For example, a predefined part of the time equivalent to one whole track can be set as the integration time. Similarly, the integration period may include the seek period or a part of it and a part of the track following period.

Figure 9:
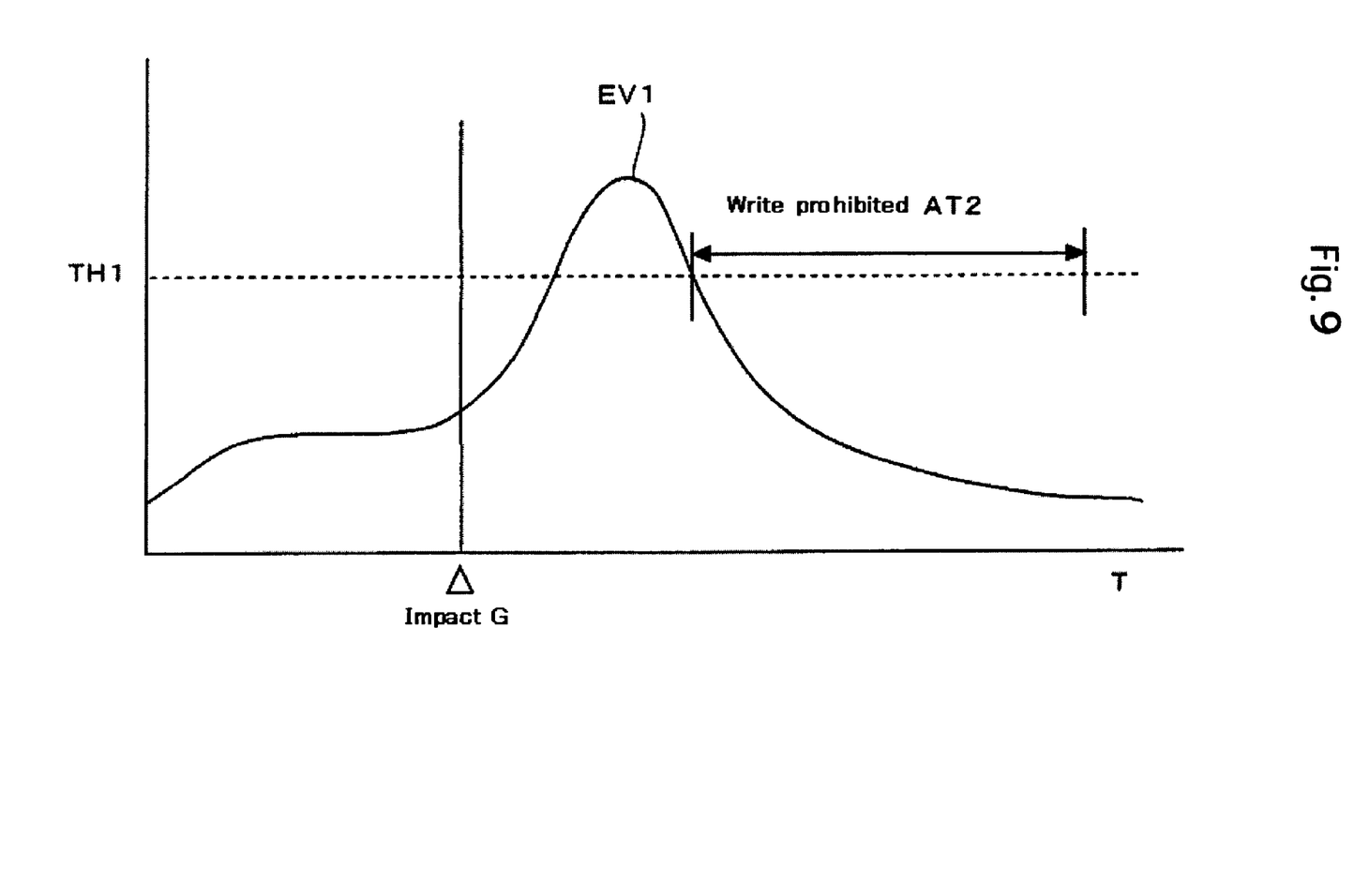
FIG. 9 schematically shows how evaluation value EV1 changes in response to an extraneous impact in a situation where the binarized signal computation section according to one embodiment of the present invention multiplies comparator output values by a weighting factor and integrates the multiplied values to generate evaluation value EV1.

Another preferred computation method is similar to the method for evaluation value EV2, which is mentioned above. More specifically, evaluation value EV1 is generated by sampling an output value that is generated by the window comparator 231, multiplying a plurality of sampled values by a weighting factor, and integrating the resulting multiplied values. The computing equation is defined so that evaluation value EV1 does not diverge. The use of a weighting factor of 1 for all sampled values corresponds to normal integration computation described above. Setup is performed so that the obtained evaluation value EV1 changes as indicated in FIG. 9 when an impact is applied from the outside. FIG. 9 shows how evaluation value EV1 changes when a great impact is applied. When a great impact is applied, evaluation value EV1 suddenly increases and exceeds threshold value TH1. Subsequently, evaluation value EV1 gradually decreases and converges to a fixed value. When evaluation value EV1 exceeds threshold value TH1, the write control section 234 concludes that an impact greater than a reference level is encountered.

Leftward z conversion of the output value of the window comparator 231 is one example of multiplying values by an appropriate weighting factor and integrating the multiplied values. A selection is made so that the value z is a value greater than 1. As is the case with evaluation value EV2 for which a difference value is used, it is preferred that evaluation value EV1 be obtained by effecting leftward z conversion by using as many previous comparator output values as possible that can be calculated from the current comparator output value. For example, it is possible to acquire a comparator output at a predetermined sampling frequency after the hard disk drive 1 starts operating, and constantly compute and generate evaluation value EV1. The value z for z conversion should be set so that evaluation value EV1 does not significantly change in response to a small impact and suddenly changes in response to a great impact. Alternatively, evaluation value EV1 may be generated with a difference equation. More specifically, the current evaluation value $EV1(n)$ can be generated by using the current difference value and an evaluation value $EV1(n-1)$ that has been generated from a previous difference value. Leftward z conversion corresponds to a computing equation that can be expressed by a difference equation.

In the foregoing description, the hard disk drive 1 detects an impact to prohibit a write operation. The hard disk drive 1 can use an impact detection method based on the above comparator output duty cycle or an impact detection method based on a servo signal for another type of control. When, for instance, a great impact is detected by these methods, the hard disk drive 1 can move the head element section 12 and slider 31 to an unload position. A load/unload type hard disk drive moves the head element section 12 and slider 31 to a ramp. A CSS type hard disk drive moves the head element section 12 and slider 31 to an unload position within an inner circular area of the magnetic disk 11. This makes it possible to avoid an error by preventing the slider 31 from colliding against the magnetic disk 11 due to impact.

While the present invention has been described in detail in conjunction with specific embodiments, persons of skill in the art will appreciate that changes, additions, and variations may be applied without departure from the scope and spirit of the present invention. The described embodiments are to be considered in all respects only as illustrative and not restrictive. The scope of the invention is, therefore, indicated by the appended claims rather than by the foregoing description. For example, the impact detection method according to the present invention can be applied to a data storage device that uses a recording disk other than a magnetic disk.

What is claimed is:

1. A data storage device comprising:
   a recording disk;
   an actuator configured to move a head over said recording disk;
   a controller configured to prohibit said head from writing onto said recording disk for a first period when a detected impact is found to be greater than a first reference level and not greater than a second reference level, and prohibiting said head from writing onto said recording disk for a period longer than said first period when said detected impact is found to be greater than said second reference level; and
   a shock sensor,
   wherein, when a seek operation is performed in a write sequence, said controller judges, in accordance with an evaluation value derived from the output of said shock sensor, whether said detected impact is greater than said second reference level, and
   wherein, when a track following operation is performed in said write sequence, said controller judges, in accordance with an evaluation value derived from a servo signal read by said head, whether said detected impact is greater than said second reference level.

2. The data storage device according to claim 1, wherein a second reference level prevailing during said seek operation differs from another second reference level prevailing during said track following operation.

3. The data storage device according to claim 1, further comprising:
   a comparator configured to binarize the output of said shock sensor;
   wherein said controller judges, in accordance with a duty cycle of a binarized signal output from said comparator, whether said detected impact is greater than said second reference level.

4. The data storage device according to claim 3, wherein said controller uses a single binarized signal output from said comparator to judge whether said detected impact is greater than said first reference level.

5. The data storage device according to claim 1, further comprising:
   a comparator configured to binarize the output of said shock sensor;
   wherein said controller samples binarized signals output from said comparator at a predetermined sampling frequency within a predetermined period of time, integrates sampled values, generates an evaluation value with a value derived from integration, and judges, if the evaluation value is greater than a threshold value, that said detected impact is greater than said second reference level.

6. The data storage device according to claim 5, wherein said integration is performed with values that are sampled during a seek period for a write operation.

7. The data storage device according to claim 1, further comprising:
  a comparator configured to binarize the output of said shock sensor;
  wherein said controller samples outputs from said comparator during a seek period in a write sequence, integrates resulting sampled values, and judges, if the integrated value is greater than a threshold value, that said detected impact is greater than said second reference level; and
  wherein, when a track following operation is performed in said write sequence, said controller calculates a difference value representing the difference between a current head position and a target head position from a servo signal, multiplies a plurality of difference values, which are obtained at different times, by a weighting factor, integrates resulting weighted values to generate an evaluation value, and judges, if the evaluation value is greater than a threshold value, that said detected impact is greater than said second reference level.

8. A data storage device comprising:
  a recording disk;
  an actuator configured to move a head over said recording disk; and
  a controller configured to prohibit said head from writing onto said recording disk for a first period when a detected impact is found to be greater than a first reference level and not greater than a second reference level, and prohibiting said head from writing onto said recording disk for a period longer than said first period when said detected impact is found to be greater than said second reference level,
  wherein, when said head accesses a target address in a write sequence, said controller calculates a difference value representing the difference between a current head position and a target head position from a servo signal, and uses the calculated difference value to judge whether said detected impact is greater than said second reference level,
  wherein said controller samples said difference value at different times, multiplies a plurality of resulting sampled values by a weighting factor, integrates resulting weighted values to generate an evaluation value, and judges, if the evaluation value is greater than a threshold value, that said detected impact is greater than said second reference level.

9. The data storage device according to claim 8, wherein said sampled values are sampled during a track following period in a write sequence.

10. A write sequence control method for use in a data storage device, comprising:
  staffing to gain access to a head's target address;
  prohibiting, if an impact that is greater than a first reference level and not greater than a second reference level is detected during a period of said access, said head from writing onto said recording disk for a first period;
  prohibiting, if an impact greater than the second reference level is detected during a period of said access, said head from writing onto said recording disk for a period longer than said first period; and
  calculating a difference value representing the difference between a current head position and a target head position from a servo signal during a track following period, multiplying current and previous sampled difference values by a weighting factor, and integrating resulting weighted values to judge whether at least one of said impacts is greater than said second reference level.

11. The write sequence control method according to claim 10, further comprising sampling a binarized value representing the output of a shock sensor during a seek period in a write sequence, integrating resulting sampled values, and judging according to the integrated value whether an impact is greater than said second reference level.

12. A write sequence control method for use in a data storage device, comprising:
  starting to gain access to a head's target address;
  prohibiting, if an impact that is greater than a first reference level and not greater than a second reference level is detected during a period of said access, said head from writing onto said recording disk for a first period;
  prohibiting, if an impact greater than the second reference level is detected during a period of said access, said head from writing onto said recording disk for a period longer than said first period; and
  judging, in accordance with a duty cycle of a binarized signal output of a shock sensor, whether at least one impact is greater than said second reference level.

13. The write sequence control method according to claim 12, further comprising sampling the binarized value representing the output of the shock sensor at a predetermined frequency during a seek period, integrating the resulting sampled values to generate an evaluation value, and judging according to the evaluation value whether said at least one impact is greater than said second reference level.

14. The write sequence control method according to claim 12, further comprising calculating a difference value representing the difference between a current head position and a target head position from a servo signal, and using the calculated difference value to judge whether another impact is greater than said second reference value.

15. The write sequence control method according to claim 14, further comprising sampling said difference value at different times, multiplying a plurality of resulting sampled values by a weighting factor, integrating resulting weighted values to generate an evaluation value, and judging, if the evaluation value is greater than a threshold value, that said another impact is greater than said second reference level.

16. The write sequence control method according to claim 12, further comprising using a single binarized signal output to judge whether a detected impact is greater than said first reference level.

17. The write sequence control method according to claim 12, further comprising:
  judging, in accordance with an evaluation value derived from an output of the shock sensor when a seek operation is performed in a write sequence, whether said at least one impact is greater than said second reference level; and
  judging, in accordance with an evaluation value derived from a servo signal read by said head when a track following operation is performed in said write sequence, whether said at least one impact is greater than said second reference level.

* * * * *